3,045,003
1:2 CHROMIUM AND COBALT COMPLEXES OF MONOAZO DYES CONTAINING A 1-AZA-4-THIA-CYCLOHEXANE-4,4-DIOXIDE SUBSTITUENT
Johannes Dehnert and Robert Gehm, Ludwigshafen (Rhine), Germany, assignors to Badische Anilin- & Soda-Fabrik Aktiengesellschaft, Ludwigshafen (Rhine), Germany
No Drawing. Filed Jan. 5, 1960, Ser. No. 505
Claims priority, application Germany Jan. 9, 1959
8 Claims. (Cl. 260—147)

This invention relates to new chromium and cobalt complex dyestuffs free from sulfonic acid groups. More particularly it relates to chromium and cobalt complex dyestuffs free from sulfonic acid groups which contain two identical azo dyestuff radicals attached to one chromium or cobalt atom.

It is known that wool can be dyed with good wet fastness properties with metal complex dyestuffs which do not contain free sulfonic acid or free carboxylic groups but contain sulfonic acid amide or carboxylic acid amide groups which bear on the nitrogen atom non-ionogenic substituents. It is also known that the wet fastness properties of such dyeings are higher the greater the molecular weights of the said non-ionogenic substituents are. As experts known, the leveling power of the metal complex dyestuffs on the other hand declines as the molecular weight of the said non-ionogenic substituents increases, so that it is often difficult to produce dyeings on wool which have excellent wet fastness properties and at the same time are level.

It is an object of the present invention to provide metal complex dyestuffs with which wool can be dyed with excellent wet fastness properties and at the same time excellent levelness.

The new dyestuffs are chromium and cobalt complexes in which to one chromium or cobalt atom there are attached two identical azo dyestuff radicals which are free from sulfonic acid groups but are substituted at the diazo or at the coupling component by the radical

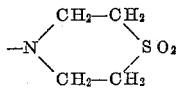

which radical is linked to the said components either directly or by way of one or more atoms forming a group of the type specified below. The diazo component is a benzene nucleus substituted by an azo group, a complex forming group attached to the benzene nucleus in ortho-position to the azo group, and if desired by neutral substituents of the type specified below. The coupling component is a benzene, a naphthalene or an enolic compound capable of coupling, each of them containing a complex forming group attached in ortho-position to the coupling carbon atom if it is an aromatic and in alpha-position if it is an enolic compound. The dyestuffs can be illustrated by the general formula

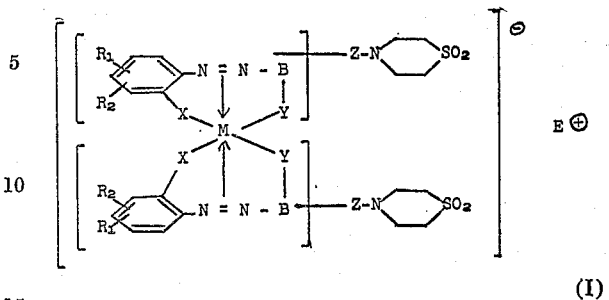

in which $E^\oplus$ represents a cation, $R_1$ and $R_2$ are each a hydrogen atom, a chlorine atom, a methyl group, a methoxy group, an ethoxy group, an acetylamino group or a nitro group, X an oxygen atom or a —COO-group, Y an oxygen atom or an —NH-group, in ortho-position or alpha-position to the azo group, Z an —$SO_2$—, —CO—, —NH—, —$CH_2$—, —$SO_2NH$—, —CO—NH—, —NH—CO—$CH_2$— or —$SO_2$—NH$(CH_2)_m$ group, $m$ being a whole number of from 2 to 6, and B is one of the groups:

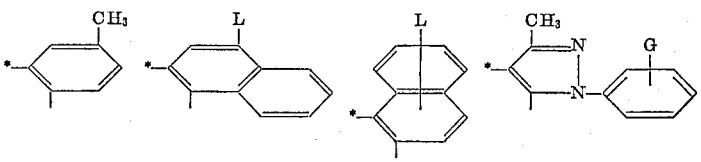

and

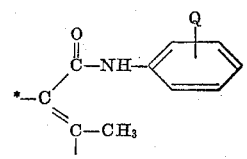

in which L is a hydrogen atom, a chlorine atom, an acetylamino group or a methoxycarbamino group, G a hydrogen atom, a methyl group or a chlorine atom, Q a hydrogen atom or a chlorine atom, and the group

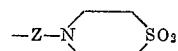

is attached to an aromatic nucleus of the azo dyestuff radical. The asterisk (*) indicates the position in which the above components are coupled to the azo group in the dyestuff structure, the remaining bond connecting the adjacent carbon atom through the divalent radical Y to the metal atom M.

The new chromium and cobalt complex dyestuffs are obtained by treating azo dyestuffs of the general formula:

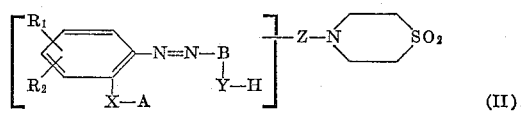

in which B, $R_1$, $R_2$, X, Y and Z have the meanings given above and A stands for a hydrogen atom or a methyl group, in aqueous solution or suspension or in an organic solvent or in a mixture of water and an organic solvent miscible with water, at elevated temperature with an agent yielding chromium or cobalt. Suitable organic solvents miscible with water include dimethylformamide and di-(2-hydroxyethyl)-ether.

Agents yielding chromium or cobalt which can be used for this purpose include sodium dichromate, potassium dichromate, ammonium dichromate, chromium(III) chloride hexahydrate, chromium(III) formate and cobalt(II) chloride hexahydrate.

The azo dyestuffs of the above Formula II can be prepared by diazotizing amines of the benzene series of the general formula:

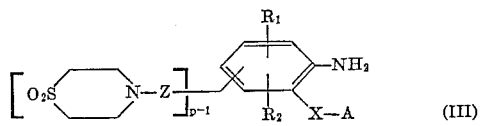

(III)

in which $R_1$, $R_2$, X, A and Z have the meanings given above and p is 1 or 2 and reacting them with coupling components of the general formula:

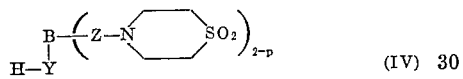

(IV)

in which B, Y, Z and p have the meanings given above.

Diazo components containing the group

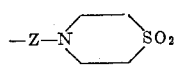

in the molecule which are suitable for the preparation of the azo dyestuffs of Formula II are for example N-(1-amino - 2 - hydroxybenzenesulfonyl), N - (1 - amino-2-methoxybenzenesulfonyl), N-(1-amino - 2 - carboxybenzenesulfonyl), N-(1-amino - 2 - hydroxybenzoyl) and N-(1-amino - 2 - methoxybenzoyl) derivatives of 1-aza-4-thiacyclohexane-4,4-dioxide.

As coupling components which bear the group

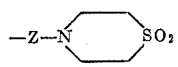

there are suitable for example the N-(acetoacetylaminobenzenesulfonyl), N-(acetoacetylamino-benzoyl), N-([3-methylpyrazol - 5 - one - 1 - yl]-benzenesulfonyl), N-([3-methylpyrazol - 5 - one - 1 - yl]-benzoyl), N-(hydroxybenzenesulfonyl) and N-(hydroxybenzoyl) derivatives of 1-aza-4-thiacyclohexane - 4,4 - dioxide and those N-(hydroxynaphthalenesulfonyl), N-(hydroxynaphthoyl), N-(aminonaphthalenesulfonyl) and N-(aminonaphthoyl) derivatives of 1-aza-4-thiacyclohexane-4,4-dioxide which permit coupling in ortho-position to the hydroxy or amino group.

These components can be obtained by reacting the corresponding sulfonic or carboxylic acid halides in aqueous suspension or in organic solvents in the presence of acid-binding agents with 1-aza-4-thiacyclohexane-4,4-dioxide and then producing the amino or hydroxyl groups necessary for diazotization or coupling in the reaction products, if they are not already present, by reduction or saponification. The dyestuff primary products may also contain the above-mentioned substituents, such as halogen atoms, and/or alkyl, alkoxy, nitro and/or acylamino groups.

Further suitable diazo components which contain the radical of 1-aza-thiacyclohexane-4,4-dioxide are for example the N-(1-amino - 2 - hydroxybenzenesulfonyl), N-(1-amino - 2 - methoxybenzenesulfonyl), N-(1-amino-2-carboxybenzenesulfonyl), N-(1-amino - 2 - hydroxybenzoyl) and N-(1-amino-2-methoxybenzoyl) derivatives of the amines or hydrazines of Table 1:

TABLE 1

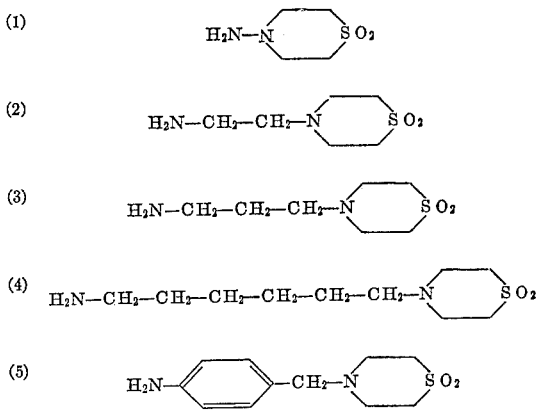

The production of 1-aza-4-thiacyclohexane-4,4-dioxide and of the amines 1 to 4 of Table 1 is described in the copending patent application Serial No. 828,048, filed July 20, 1959, by Robert Gehm and Johannes Dehnert.

The amine 5 may be obtained for example by reaction of 4-nitrobenzyl chloride with 1-aza-4-thiacyclohexane-4,4-dioxide and reduction of the 1-(4-nitrobenzyl)-1-aza-4-thiacyclohexane-4,4-dioxide formed.

The acid amides containing the radical of 1-aza-4-thiacyclohexane-4,4-dioxide can be prepared, using the amines of Table 1, by the usual methods known for the production of substituted amides of these acids. A further substance suitable for the production of the new dyestuffs is for example 1-carboxymethyl-1-aza - 4 - thiacyclohexane-4,4-dioxide, the production of which is described in the Journal of the Chemical Society, London, volume 123, page 2888.

By reaction of 1-hydroxy-2-amino-4,6-dinitrobenzene with the carboxylic acid chloride of 1-carboxymethyl-1-aza-4-thiacyclohexane-4,4-dioxide and partial reduction of the reaction product there is obtained for example the diazo component of the formula:

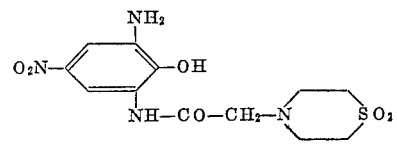

By coupling the diazotized amine 5 of Table 1 with a hydroxynaphthalenesulfonic acid which couples in ortho-position to the hydroxy group, oxidative coppering of the resultant azo compound according to the process of U.S. patent specification No. 2,674,595 and reductive splitting off of the copper complex, it is possible for example to prepare the diazo component of the formula:

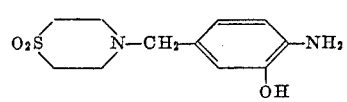

Suitable coupling components which contain the radical of 1-aza-thiacyclohexane - 4,4 - dioxide include the N-(acetoacetylaminobenzenesulfonyl), N-([3 - methylpyrazol - 5 - one - 1 - yl]-benzenesulfonyl), N-([3-methylpyrazol - 5 - one - 1 - yl]-benzoyl), N-(hydroxybenzoyl), N-(hydroxybenzenesulfonyl) derivatives of the amines of Table 1 and those N-(hydroxynaphthalenesulfonyl), N-(hydroxynaphthoyl), N-(aminonaphthalenesulfonyl) and N-(aminonaphthoyl) derivatives of the amines of Table 1 which permit coupling in ortho-position to the hydroxy or amino group. These compounds can be prepared by known methods.

Further coupling components which may be used for the production of the new dyestuffs are given in Table 2:

TABLE 2

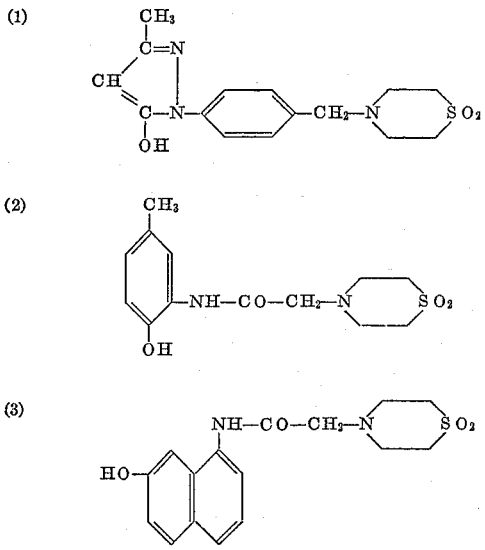

The pyrazolone derivative 1 is obtained in known manner from the amine 5 of Table 1. The carboxylic acid chlorides necessary for the production of the coupling components 2 and 3 can be prepared for example from chloracetyl chloride and 1-aza-4-thiacyclohexane-4,4-dioxide.

The new chromium and cobalt complex dyestuffs are suitable for dyeing silk, leather, synthetic polyamides and polyurethanes, but especially well for dyeing wool. As compared with comparable dyestuffs which contain instead of the group

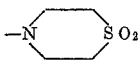

a sulfonic acid amide or carboxylic acid amide group which has non-ionogenic substituents attached to the nitrogen atom and in which the said substituted sulfonic acid amide or carboxylic acid amide group has about the same molecular weight as the group

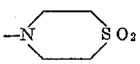

they give on wool dyeings of considerably better levelness and of wet fastness properties which are at least as good.

The following examples will further illustrate this invention but the invention is not restricted to these examples. The parts are parts by weight.

*Example 1*

36 parts of 1-(3-acetylamino-4-methoxybenzenesulfonyl)-1-aza-4-thiacyclohexane-4,4-dioxide are boiled for an hour under reflux with 75 parts of concentrated hydrochloric acid and 500 parts of water to saponify the acetylamino group. The amine hydrochloride is diazotized with 30 parts of a 23% aqueous sodium nitrite solution while cooling with ice and coupled with 15 parts of 2-hydroxynaphthalene dissolved in 250 parts of 2% caustic soda solution with the addition of 100 parts of sodium carbonate and 250 parts of ice. The dyestuff formed is filtered off by suction, washed with water and dried.

For the preparation of the 1:2-cobalt complex, the metal-free dyestuff is reacted with a solution of 13 parts of crystallized cobalt chloride and 20 parts of 25% aqueous ammonia in 500 parts of di-(2-hydroxyethyl) ether at 130° to 135° C., until the metallization is complete. The cobalt complex is isolated by introducing the reaction mixture into a solution of 500 parts of sodium chloride in 5000 parts of water, filtration by suction and drying of the reaction product; the dyestuff is obtained as a dark red-brown powder which dissolves in hot water with a bluish red color.

100 parts of polycaprolactam fibers are introduced into a bath containing in 2000 parts of water, 1 part of the said cobalt complex, 4 parts of 25% aqueous ammonia, 1 part of di-(hydroxyethyl)-amine and 1 part of the sodium salt of a sulfonated adduct of 30 mols of ethylene oxide and 1 mol of octadecyl alcohol, the bath heated for 30 minutes at boiling temperature, then 4 parts of ammonium sulfate are added and dyeing continued for another 30 minutes at a bath temperature of 98° to 100° C. After rinsing the fabric, a Bourdeaux dyeing of excellent fastness properties and excellent levelness is obtained.

For the production of the corresponding 1:2-chromium complex compound, the dry metal-free dyestuff is stirred at 125° C. with 500 parts of di-(2-hydroxyethyl) ether. In the course of an hour, a solution of 10 parts of sodium bichromate in 100 parts of di-(2-hydroxyethyl) ether is allowed to flow in and the mixture is stirred at 130° to 135° C. until the initial dyestuff can no longer be detected by paper chromatographic methods. The mixture resulting from the chroming is introduced into 5000 parts of water and 500 parts of sodium chloride are added. The dyestuff, after filtration by suction, is washed with a little water and dried. It forms a dark violet-brown powder which dissolves in water with a red-violet color and gives on wool uniform and fast brown-violet dyeings from a neutral to weakly acid bath.

*Example 2*

12.3 parts of 2-methoxy-1-aminobenzene are diazotized in the usual way and coupled with a solution of 35 parts of 1-(6-hydroxynaphthalene-2-sulfonyl)-1-aza-4-thiacyclohexane-4,4-dioxide in 250 parts of 2% caustic soda solution, with the addition of 50 parts of sodium carbonate and 250 parts of ice, and the resultant red dyestuff reacted with 13 parts of cobalt(III) chloride hexahydrate as described in Example 1. The reaction mixture is introduced into 5000 parts of water and the deposited dyestuff is filtered off by suction, washed and dried. It forms a red-brown powder which dissolves in water with a dark red color.

100 parts of wool yarn are introduced into a bath consisting of 3000 parts of water, 2 parts of the said cobalt complex, 2 parts of the sodium salt of a sulfonated adduct of 80 mols of ethylene oxide and 1 mol of octadecyl alcohol, 5 parts of ammonium acetate and 3 parts of 30% aqueous acetic acid. The bath is heated to 100° C. within 30 minutes and this temperature maintained for another 20 minutes. After rinsing, a very level, extremely fast yellowish-Bordeaux dyeing is obtained.

The corresponding 1:2-chromium complex, prepared as described in the third paragraph of Example 1, gives on wool red-violet dyeings of similar properties.

The following dyestuffs are prepared in a similar manner:

and then a solution of 13 parts of cobalt(II) chloride hexahydrate in 100 parts of water is added. The whole is heated to 60° to 70° C. and this temperature maintained until metal-free azo dyestuff is no longer detect-

| Example No. | Diazo component | Coupling component | Shade of dying on wool of— | |
|---|---|---|---|---|
| | | | 1:2-cobalt complex | 1:2-chromium complex |
| 3 | 1-(-methyl-4-amino-5-methoxy-benzene-sulfonyl)-1-aza-4-thiacyclo-hexane-4,4-dioxide. | 2-hydroxynaphthalene | red-violet | blue-violet. |
| 4 | 1-(2-methyl-4-amino-5-methoxy-benzene-sulfonyl)-1-aza-4-thiacyclo-hexane-4,4-dioxide. | 1-phenyl-3-methyl-pyrazolone-(5) | yellow-brown. | red. |
| 5 | 1-(2,5-dimethoxy-4-aminobenzene-sulfonyl)-1-aza-4-thiacyclohexane-4,4-dioxide. | 2-hydroxynaphthalene | violet | blue. |
| 6 | 1-(2,5-dimethoxy-4-aminobenzene sulfonyl)-1-aza-4-thiacyclohexane-4,4-dioxide. | 8-methylamino-2-hydroxynaphthalene | blue | green-blue. |
| 7 | 1-amino-2-methoxy-5-chlorbenzene | 1-(6-hydroxy-naphthalene-2-sulfonyl)-1-aza-4-thiacyclo-hexane-4,4-dioxide. | Bordeaux | violet. |
| 8 | 1-amino-2,5-di-methoxybenzene | 1-(3-hydroxy-naphthalene-2-sulfonyl)-1-aza-4-thiacyclo-hexane-4,4-dioxide. | violet | blue. |
| 9 | 1-(3-amino-4-methoxybenzoyl)-1-aza-4-thiacyclo-hexane-4,4-dioxide. | 2-hydroxynaphthalene | Bordeaux | brown-violet. |

*Example 10*

30.6 parts of 1-(3-amino-4-hydroxybenzenesulfonyl)-1-aza-4-thiacyclohexane-4,4-dioxide are dissolved in 300 parts of normal hydrochloric acid and diazotized at 0° to 5° C. with 30 parts of 23% sodium nitrite solution. The diazo compound obtained is coupled with a solution of 22 parts of 8-methylcarbamino-2-hydroxynaphthalene in 400 parts of 1% caustic soda solution with an addition of 250 parts of ice and 50 parts of sodium carbonate. The violet dyestuff formed is filtered off by suction and washed with dilute sodium chloride solution.

For conversion into the cobalt complex, the metal-free dyestuff is stirred as a moist paste with 200 parts of water able. After cooling, the complex dyestuff formed is filtered off by suction, washed with a little water and dried. It is a dark brown powder which dissolves in hot water with a violet color and dyes wool from a neutral to weak acid bath in fast violet shades.

If the metal-free azo dyestuff is converted as a dry powder into its chromium complex by the process according to U.S. patent specification No. 2,230,686, Example 1, a blue-grey powder is obtained which dyes wool from a neutral to weak acid bath in fast blue-grey shades.

The following dyestuffs can be prepared in a similar manner:

| Example No. | Diazo component | Coupling component | Shade of dyeing on wool of— | |
|---|---|---|---|---|
| | | | 1:2-cobalt-complex | 1:2-chromium-complex |
| 11 | 1-aminobenzene-2-carboxylic acid | [structure with CH₃, CH-N, HC, C-N, OH, SO₂-N, SO₂] | | yellow. |
| 12 | 1-amino-2-hydroxy-5-nitrobenzene | [structure with CH₃, CH-N, HC, C-N, OH, SO₂-N, SO₂] | yellow | orange. |
| 13 | 1-amino-2-hydroxy-3-nitro-5-methylbenzene | [structure with CH₃, CH-N, HC, C-N, OH, SO₂-N, SO₂] | | red. |
| 14 | 1-amino-2,4-dichlorbenzene-6-carboxylic acid | [structure with CH₃, CH-N, HC, C-N, OH, SO₂-N, SO₂] | | yellow. |
| 15 | 1-(4-amino-5-hydroxy-benzenesulfonyl)-1-aza-4-thiacyclohexane-4,4-dioxide. | 1-phenyl-3-methyl-pyrazolone-(5) | yellow-brown | scarlet. |

| Example No. | Diazo component | Coupling component | Shade of dyeing on wool of— | |
|---|---|---|---|---|
| | | | 1:2-cobalt-complex | 1:2-chromium-complex |
| 16 | 1-(4-amino-5hydrox-ybenzenesulfonyl)-1-aza-4-thiacyclohexane-4,4-dioxide. | 2-hydroxynaphthalene | red-violet | blue-vilet. |
| 17 | 1-amino-2-hydroxy-4-nitrobenzene | 1-(6-aminonaphthalene-2-sulfonyl)-1-aza-4-thiacyclohexane-4,4-dioxide. | blue | |
| 18 | 1-(3-amino-4-hydroxybenzenesulfonyl)-1-aza-4-thiacyclohexane-4,4-dioxide. | 1-(4-chlorophenyl)-3-methylpyrazolone-(5) | yellow | orange. |
| 19 | 1-amino-2-hydroxy-3-acetylamino-5-nitrobenzene | HN—CO—N⟨ ⟩SO₂ attached to HO-naphthalene | grey | olive. |
| 20 | 1-amino-2-hydroxy-5-nitrobenzene | HN—CO—H⟨ ⟩SO₂ attached to HO-naphthalene | do | Do. |
| 21 | 1-amino-2,5-diethoxy-benzene | 1-(3-hydroxynaphthalene-2-sulfonyl)-1-aza4-thiacyclohexane-4,4-dioxide. | violet | blue. |
| 22 | 1-(3-carboxy-4-amino-benzenesulfonyl)-1-aza-4-thiacyclohexane-4,4-dioxide. | 1-(2-methylphenyl)-3-methylpyrazolone-(5) | | yellow. |
| 23 | 1-amino-2-hydroxy-5-nitrobenzene | HN—SO₂—N⟨ ⟩SO₂ attached to HO-naphthalene | grey | olive. |
| 24 | 1-(3-amino-4-hydroxy-benzenesulfonyl)-1-aza-4-thiacyclohexane-4,4-dioxide. | 8-acetylamino-2-hydroxynaphthalene | violet | blue-grey. |

*Example 25*

42 parts of the compound of the formula

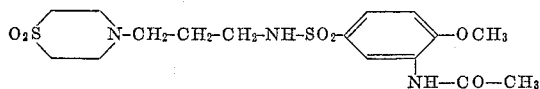

are boiled for an hour under reflux with 75 parts of concentrated hydrochloric acid and 500 parts of water to saponify the acetylamino group. The amine hydrochloride is diazotized with ice cooling with 30 parts of a 23% aqueous sodium nitrite solution and coupled with 15 parts of 2-hydroxynaphthalene dissolved in 250 parts of 2% aqueous sodium hydroxide solution with the addition of 100 parts of sodium carbonate and 250 parts of ice. The dyestuff formed is filtered off by suction, washed with water and reacted with a solution of 13 parts of crystallized cobalt chloride and 20 parts of 25% aqueous ammonia in 500 parts of di-(2-hydroxyethyl) ether at 130° to 135° C. until the cobalt complex of the dyestuff has been completely formed. After the reaction mixture has been introduced into a solution of 500 parts of sodium chloride in 5000 parts of water, filtration and drying, the cobalt complex is obtained as a dark red-brown powder which dissolves in hot water with a bluish-red color and dyes wool and polyamide fibers Bordeaux shades which are very level and fast.

For the preparation of the 1:2-chromium complex compound, the dry metal-free azo dyestuff is stirred at 125° C. with 500 parts of di-(2-hydroxyethyl) ether. In the course of an hour a solution of 10 parts of sodium dichromate in 100 parts of di-(2-hydroxyethyl) ether is added and the whole stirred at 130° to 135° C. until initial dyestuff can no longer be detected by paper chromatographic methods. The chroming mixing is introduced into 5000 parts of water and 500 parts of sodium chloride are added. The dyestuff is filtered off by suction, washed with a little water and dried. It is a dark violet-brown powder which dissolves in water with a red-violet color and dyes wool very level and fast brown-violet shades from a neutral to weak acid bath.

*Example 26*

12.3 parts of 2-methoxy-1-aminobenzene are diazotized in the usual way and coupled with a solution of 40 parts of the compound of the formula:

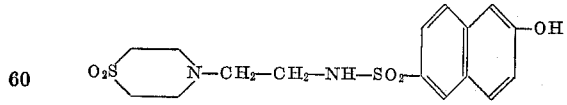

in 250 parts of 2% aqueous sodium hydroxide solution with the addition of 50 parts of sodium carbonate and 250 parts of ice, and the red dyestuff obtained is reacted in the way described in Example 24, paragraph 2, with 13 parts of cobalt (II) chloride hexahydrate. The reaction mixture is introduced into 5000 parts of water and the deposited dyestuff filtered off by suction, washed and dried. It is a brown-red powder which dissolves in water with a dark red color and gives on wool from a neutral to weak acid bath very level and fast dyeings in yellowish Bordeaux shades. The corresponding 1:2-chromium complex, prepared as in Example 25, gives red-violet dyeings of similar properties.

The following dyestuffs may be prepared in a similar way:

| Example No. | Diazo component | Coupling component | Shade of the dyeing on wool of the— 1:2-cobalt complex | Shade of the dyeing on wool of the— 1:2-chromium complex |
|---|---|---|---|---|
| 27 | O₂S⟨ ⟩N—(CH₂)₃—NH—SO₂—(H₃C, NH₂, OH-phenyl) | 2-hydroxynaphthalene | red-violet | blue violet |
| 28 | O₂S⟨ ⟩N—(CH₂)₃—NH—SO₂—(H₃C, NH₂, OH-phenyl) | 3-methyl-1-phenyl-5-pyrazolone | yellow-brown | red |
| 29 | O₂S⟨ ⟩N—(CH₂)₆—NH—SO₂—(NH₂, OCH₃-phenyl) | 3-methyl-1-phenyl-5-pyrazolone | yellow | orange |
| 30 | O₂S⟨ ⟩N—(CH₂)₂—NH—SO₂—(H₃C, NH₂, OH-phenyl) | 2-hydroxynaphthalene | red-violet | blue-violet |
| 31 | O₂S⟨ ⟩N—(CH₂)₂—NH—SO₂—(H₃C, NH₂, OH-phenyl) | CH₃—O—CO—NH-(2-hydroxynaphthyl) | blue | grey-blue |
| 32 | (Cl, NH₂, OCH₃-phenyl) | 6-hydroxynaphthalene-SO₂—NH—(CH₂)₂—N⟨ ⟩SO₂ | Bordeaux | violet |
| 33 | (H₃CO, NH₂, OCH₃-phenyl) | 4-hydroxynaphthalene-2-SO₂—NH—(CH₂)₆—N⟨ ⟩SO₂ | violet | blue |
| 34 | (H₃CO, NH₂, OCH₃-phenyl) | 2-hydroxy-3-(CO—NH—N⟨ ⟩SO₂)-naphthalene | violet | blue |
| 35 | (O₂N, NH₂, OCH₃-phenyl) | (CH₃, OH, NH—CO—CH₂—N⟨ ⟩SO₂-phenyl) | red-brown | brown |

Example 36

35 parts of the compound of the formula:

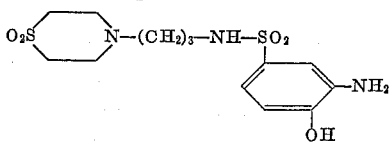

are dissolved in 300 parts of normal hydrochloric acid and diazotized at 0° to 5° C. with 30 parts of 23% sodium nitrite solution. The diazo compound obtained is coupled with a solution of 22 parts of 8-methylcarbamino-2-hydroxynaphthalene in 400 parts of 1% aqueous sodium hydroxide solution with the addition of 250 parts of ice and 50 parts of sodium carbonate. The violet dyestuff formed is filtered off by suction and washed with dilute sodium chloride solution. To convert it into the cobalt complex, the dyestuff is stirred as a moist paste with 200 parts of water and then a solution of 13 parts of cobalt(II) chloride hexahydrate added. After heating to 60° to 70° C., 50 parts of 25% aqueous ammonia are added. The temperature of the reaction mixture is maintained at 60° to 70° C. until metal-free azo dyestuff is no longer detectable by paper chromatographic methods. After cooling, the complex dyestuff formed is filtered off by suction, washed with a little water and dried. It is a dark brown powder which dissolves in hot water with a violet color and dyes wool fast violet shades from a neutral to weak acid bath.

If the metal-free azo dyestuff as a dry powder is converted into its chromium complex by the process according to U.S. patent specification No. 2,230,686, a blue-grey powder is obtained which dyes wool fast blue-grey shades from a neutral to weak acid bath.

The following dyestuffs may be prepared in a similar fashion:

| Example No. | Diazo component | Coupling component | Shade of dyeing on wool of: | |
|---|---|---|---|---|
| | | | 1:2-cobalt complex | 1:2-chromium complex |
| 37 | | | | yellow |
| 38 | | | | Do. |
| 39 | | | yellow | orange. |
| 40 | | | yellow-brown. | red. |
| 41 | | | | yellow. |
| 42 | | | yellow | Do. |
| 43 | | | grey | olive. |

| Example No. | Diazo component | Coupling component | Shade of the dyeing on wool of the— | |
|---|---|---|---|---|
| | | | 1:2-cobalt complex | 1:2-chromium complex |
| 44 | (structure) | (structure) | grey | olive. |
| 45 | (structure) | (structure) | violet | blue-grey. |
| 46 | (structure) | (structure) | blue | |

Example 47

100 parts of a woolen yarn fabric are introduced into a bath at 45° C. consisting of 3000 parts of water, 2 parts of the chromium complex of Example 45 and 5 parts of ammonium acetate. The temperature of the bath is then raised within 45 minutes to 98° C. and maintained at this level another 15 minutes. A blue-grey dyeing is obtained having excellent levelness and outstanding fastness properties.

We claim:

1. A metal complex dyestuff which has one metal atom selected from the group consisting of chromium and cobalt attached to two identical azo dyestuff radicals and which has the formula

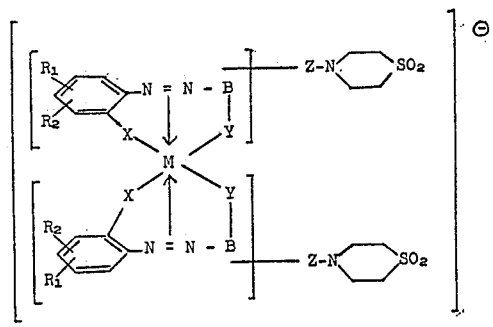

in which: M represents said metal atom; E⊕ represents a cation; $R_1$ represents a substituent selected from the group consisting of hydrogen, chlorine, methyl, methoxy, ethoxy, nitro and acetylamino; $R_2$ represents a substituent selected from the group consisting of hydrogen, chlorine, methyl and nitro; X is a divalent radical selected from the group consisting of oxygen and $$-\overset{O}{\underset{\|}{C}}-O-$$

Y is a divalent radical selected from the group consisting of oxygen and —NH—; Z is a divalent radical attached to an aromatic nucleus of each azo dyestuff radical and is selected from the group consisting of —$SO_2$—, —CO—, —$CH_2$—, —$SO_2$—NH—, —CO—NH—, —NH—CO—$CH_2$— and —$SO_2$—NH—$(CH_2)_m$— wherein m is one of the numbers of the series 2, 3, 4, 5 and 6 and wherein the substituent

is attached to the right side of the formulae of said radicals; and B is a divalent radical selected from the group consisting of the azo coupled components:

(a) 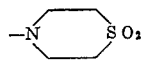

(b) 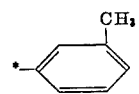

(c) 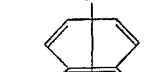

(d) 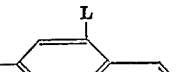

and (e) 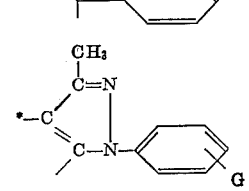

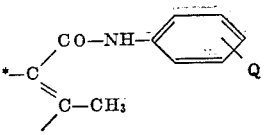

wherein the asterisk (*) marks the position at which the coupling component is connected to the azo group, L is a substituent selected from the group consisting of hydrogen, acetylamino and methoxycarbamino, G is a substituent selected from the group consisting of hydrogen, methyl and chlorine, and Q is a substituent selected from the group consisting of hydrogen and chlorine.

2. A chromium complex dyestuff which has a chromium atom attached to two identical azo dyestuff radicals and which has the formula
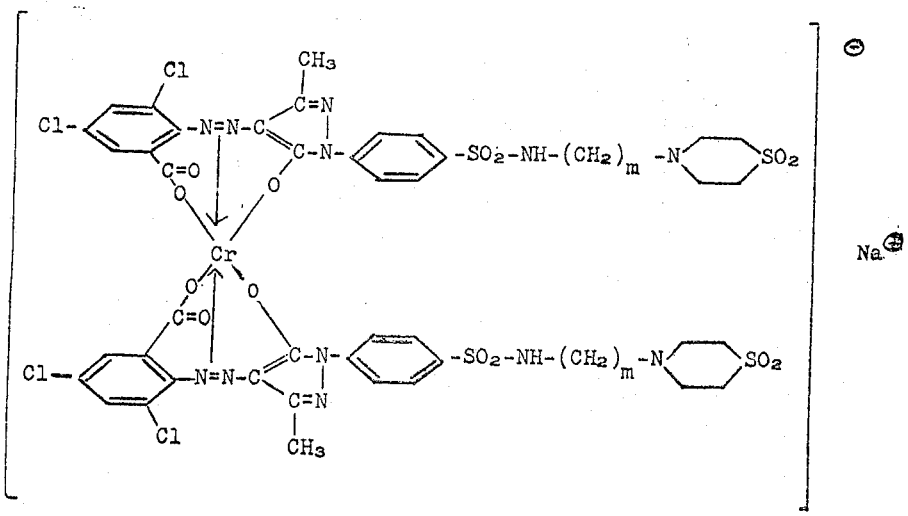
in which $m$ is one of the numbers 2, 3, 4, 5 and 6.
3. A chromium complex dyestuff which has a chromium atom attached to two identical azo dyestuff radicals and which has the formula
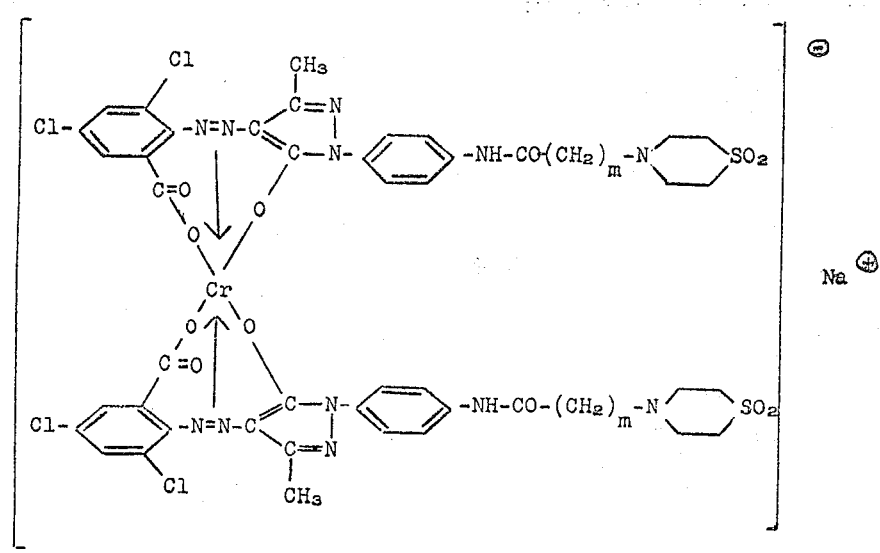
in which $m$ is one of the numbers 2, 3, 4, 5 and 6.
4. The chromium complex dyestuff of the formula:
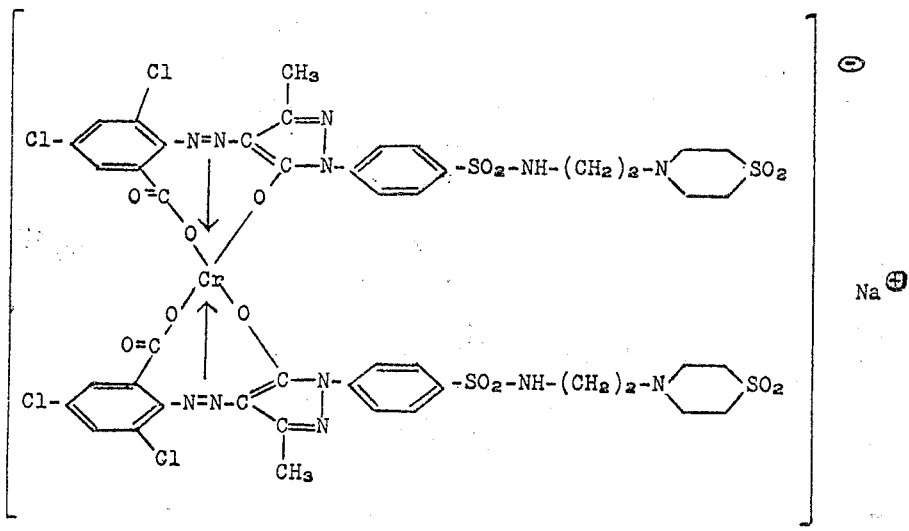

5. The chromium complex dyestuff of the formula:
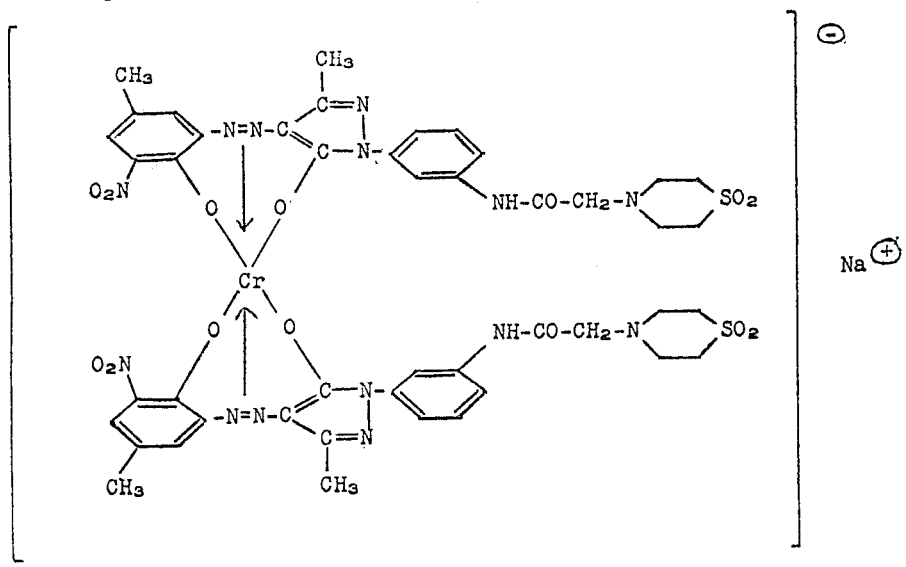
6. The cobalt complex dyestuff of the formula:
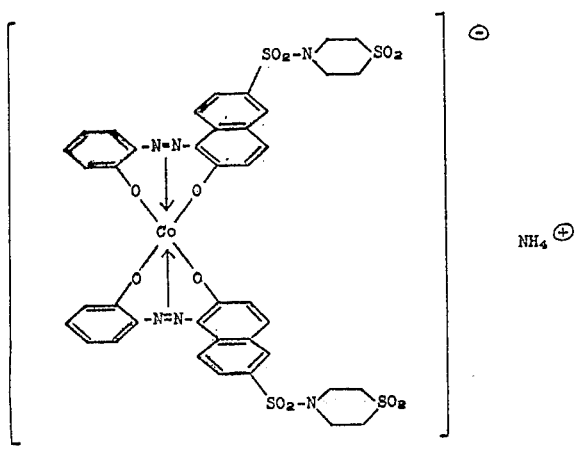
7. The cobalt complex dyestuff of the formula:
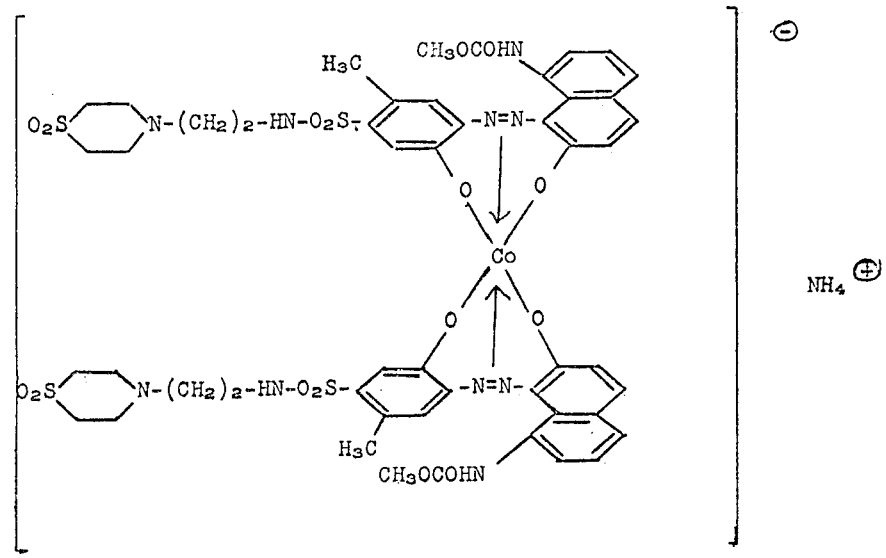

8. The chromium complex dyestuff of the formula:
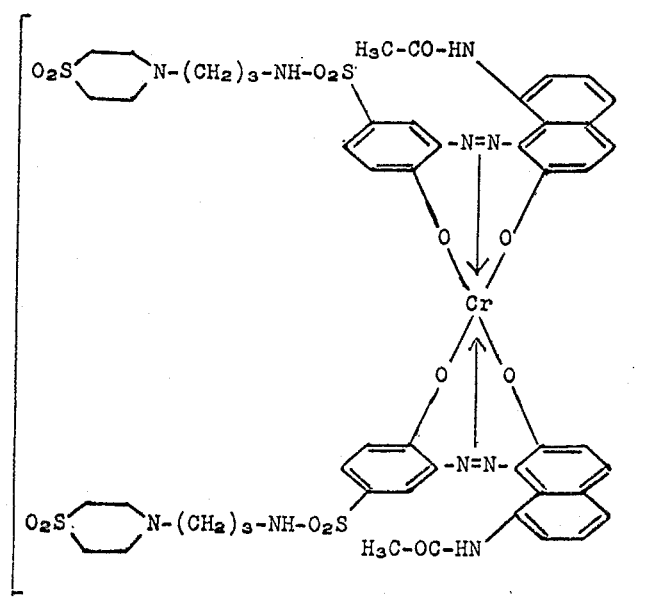 
No references cited.